Figure 1:
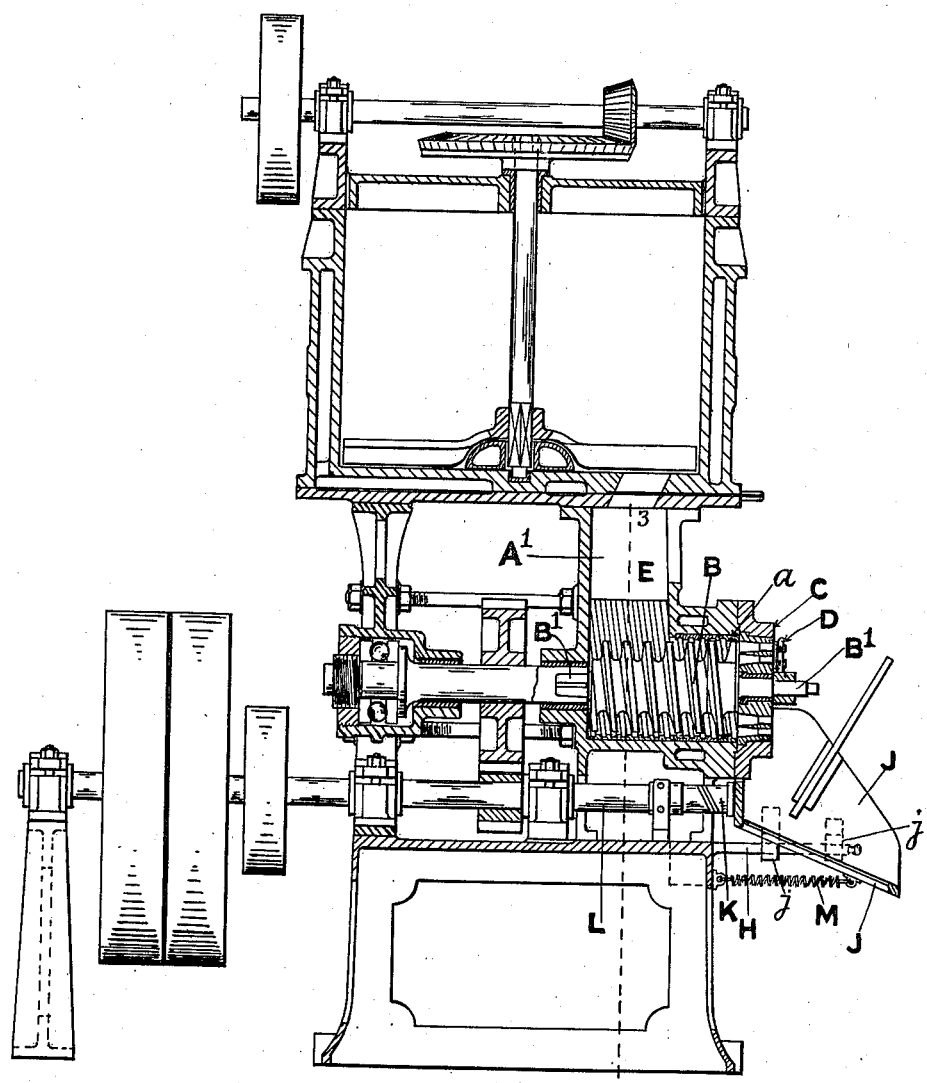

A. W. SIZER.
EXTRUSION MACHINE OF THE WORM SCREW COMPRESSING TYPE.
APPLICATION FILED JULY 15, 1919.

1,402,672.

Patented Jan. 3, 1922.
4 SHEETS—SHEET 1.

A. W. SIZER.
EXTRUSION MACHINE OF THE WORM SCREW COMPRESSING TYPE.
APPLICATION FILED JULY 15, 1919.

1,402,672.

Patented Jan. 3, 1922.
4 SHEETS—SHEET 2.

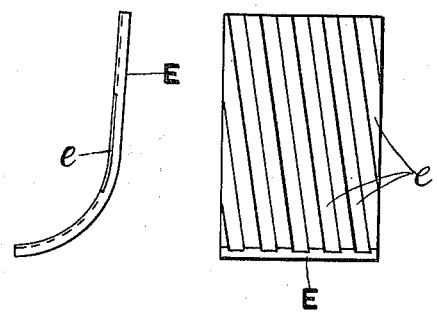
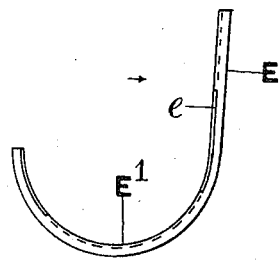
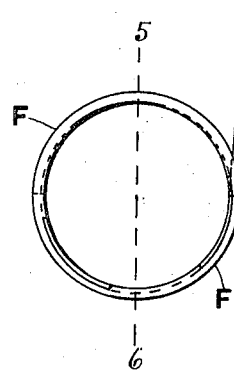

A. W. SIZER.
EXTRUSION MACHINE OF THE WORM SCREW COMPRESSING TYPE.
APPLICATION FILED JULY 15, 1919.
1,402,672.
Patented Jan. 3, 1922.
FIG. 11.
FIG. 10.
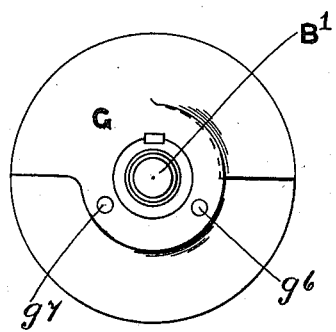
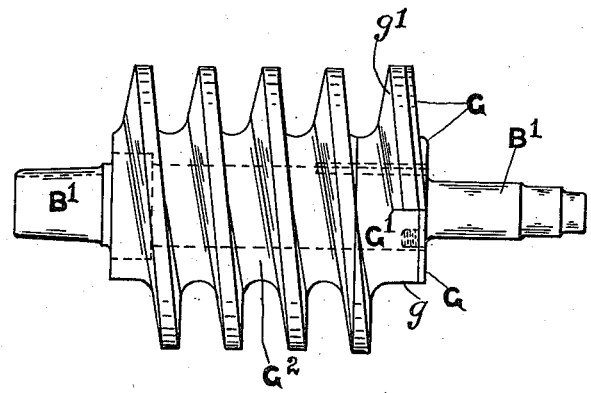
FIG. 14.   FIG. 13.   FIG. 12.
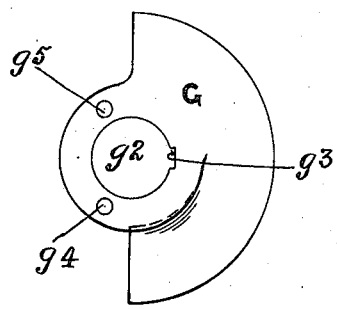
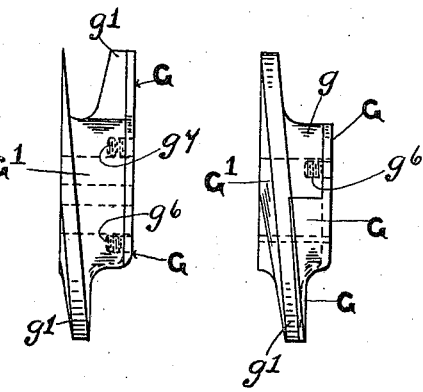
Inventor
Albert W. Sizer.
by Herbert W. Renner
Attorney

UNITED STATES PATENT OFFICE.

ALBERT WILLIAM SIZER, OF HESSLE, NEAR KINGSTON-UPON-HULL, ENGLAND.

EXTRUSION MACHINE OF THE WORM-SCREW COMPRESSING TYPE.

1,402,672. Specification of Letters Patent. Patented Jan. 3, 1922.

Application filed July 15, 1919. Serial No. 311,045.

*To all whom it may concern:*

Be it known that I, ALBERT WILLIAM SIZER, a subject of the King of Great Britain, residing at Hessle, near Kingston-upon-Hull, in the county of York, England, have invented certain new and useful Improvements in Extrusion Machines of the Worm-Screw Compressing Type, of which the following is a specification.

This invention has reference to that type of machine or apparatus for compressing and moulding plastic and like materials and substances wherein compression and moulding of the material or substance is effected by means of a worm-screw rotating in a cylindrical chamber, which machine or apparatus in accordance with the present invention embodies certain novel features among which may be mentioned the following:—First, means whereby, in the case for example of the manufacture of small blocks or the like, or "cubes" as they are generally called from meal, for use as food for cattle and other animals more particularly, it is rendered possible to compress the meal or the like in a cold state instead of having to heat it and subject it to the action of the machine in a hot or warm state as has hitherto been necessary. This is a great advancement on the manufacture of compressed blocks of meal or the like for use as food for cattle and other animals as it effects a considerable saving in the cost of, and time occupied in production, in that it dispenses with the necessity for first cooking the meal or the like, renders unnecessary the cooling of the blocks or the like so produced and thereby dispenses with the necessity for employing apparatus for cooling such blocks or the like when they leave the compressing machine, so saving the cost of cooling apparatus. Further and equally important advantages resulting from my improvements is that grades of meal or material can be moulded which it has hitherto been considered impossible to mould. Second, the provision on the front end of the worm screw of an improved wearing piece which can be readily removed when it becomes worn and can be substituted by a new wearing piece. This effects a great saving in the cost of repairs to the machine as it prevents wear on the front of the worm-screw which, if not protected, quickly wears away with the result that the entire worm, or a portion thereof if the worm is made in two portions as is sometimes the case, has to be discarded, whereas by the employment of my improved wearing piece, such wearing piece takes the wear and protects the front end of the worm screw, and third, means for imparting a quick reciprocating movement to the screen or sieve on to which the cut pieces of extruded compressed material fall when they pass out of the delivery end of the machine.

This invention will be best understood from a consideration of the following detailed description of the same taken in conjunction with the accompanying drawings forming a part of this specification.

Figure 2:
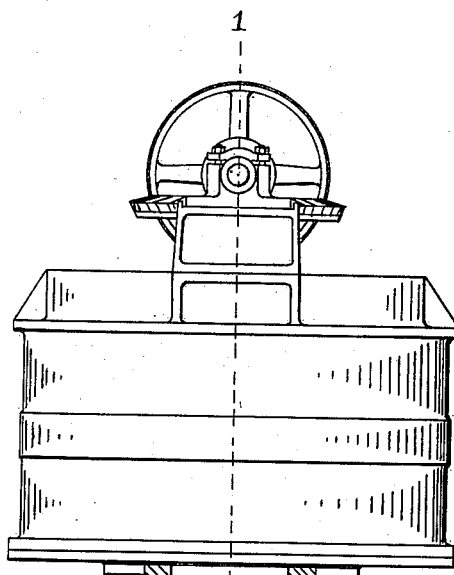
Figure 3:
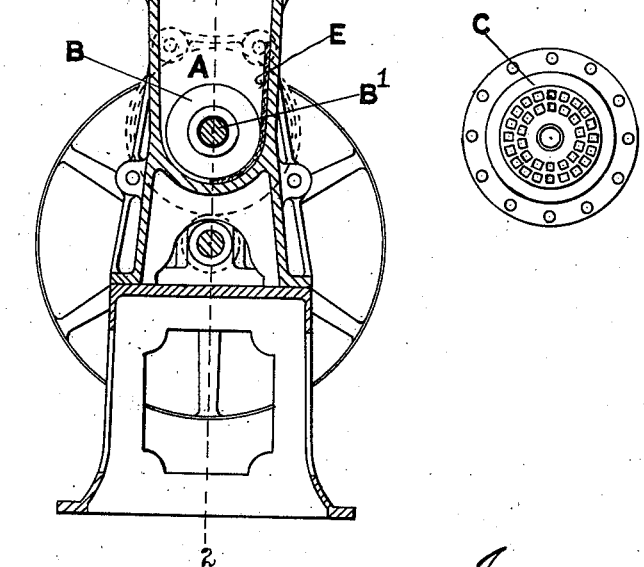

In the drawings, Fig. 1 is a sectional side elevation of an extrusion machine provided with my improvements taken on the line 1—2 of Fig. 2; Fig. 2 is an end view partly in section, the section being taken on the line 3—4 of Fig. 1. Fig. 3 is a front view of the die plate through which the material is extruded, detached from the machine. Fig. 4 is an end view of a grooved device designed to fill up the space at one side of the admission end of the compressing chamber of the machine and underneath the back end of the compressing worm-screw; Fig. 5 is a view of the grooved face of such device; Fig. 6 is an end view of a similar device but with the bottom continued to form a semi-circular trough which encloses the bottom half of the back end of the worm-screw, and Fig. 7 is a view taken in the direction of the arrow in Fig. 6. Fig. 8 is an end view of a similar device, but which is in the form of a tube the upper part of the back part of which is omitted, the tube like portion entirely enclosing a portion of the worm-screw, the semi-circular back portion forming a trough for the back end of the worm-screw, said device being provided inside with a suitably deep thread, a removable flat piece with inclined grooves on its inside face being provided to fit into and fill up the space at the admission end of the compression chamber directly below the feed hopper or the like at the intake side of the compressing worm-screw, and Fig. 9 is a section on the line 5—6 of Fig. 8.

Fig. 10 is a side view of the compressing worm showing the detachable front portion thereof and the renewable wearing cap or piece on such detachable portion; Fig. 11 is a view of the front end of the same; Fig 12 is a side view of the detachable front portion of the compressing worm and the wearing piece or cap thereon turned to a different position to that shown in Fig. 10; Fig. 13 is a side view of the same turned to still another position, and Fig. 14 is a front view of the wearing piece itself.

Similar reference characters indicate like or corresponding parts throughout the several figures of the drawings.

One construction of machine to which my improvements are applied is shown at Figs. 1 and 2 of the drawings and is, as before mentioned, of the type wherein the material is compressed and moulded in a cylindrical chamber A by a suitably driven compressing worm-screw B. The material to be compressed and moulded enters the back end of the chamber through a feed passage or spout $A^1$ and is engaged by the worm-screw which carries it forward and forces it through holes or passages in a die plate C secured to the front of the cylindrical chamber A, the extruded compressed material which is given the required cross-sectional shape as it is forced through the holes in the die plate C, being as a rule cut into pieces of the desired length by a knife D mounted on the forward end of the worm spindle $B^1$, which knife rotates around the face of the die plate as the worm rotates.

In machines of the type described the back end of the compression chamber in which the worm works is usually larger in size than the remainder of the chamber by reason of the spout or inlet by which the material to be operated on enters such chamber, joining the cylinder at that point, one or both sides of the inside of such back end of the chamber being as a rule recessed as a result of which there is a space between the compressing worm at that point and one or both of the walls of the back end of the chamber, furthermore such wall or walls is or are smooth or almost so. The recessing of one of the sides of the back end of the compression chamber has been with the object of allowing of there being a full feed of material to the intake side of the compressing worm as well as to the top of such worm.

To assist the forward movement of the material and to overcome any tendency of it to rotate with the compressing worm without traveling forward, I have previously fitted in the forward end of the compression chamber a metal liner having a helical groove or a plurality of helical grooves as described and illustrated in the specification and drawings of British Letters Patent No. 26,713 of the year 1912, which were granted to me for that invention, such liner being indicated at $a$ in Fig. 1 of the present drawings.

One part of the present invention consists of the employment of a filling piece for partially or entirely closing the space between the back end of the compression chamber and the compressing worm, such filling piece consisting in one form of a plate E having its bottom bent to the form of a segment of a circle, the said plate having oblique or like suitably deep grooves $e$ in its inside face, the said plate being shown in position in the machine in Figs. 1 and 2 of the drawings and separate from the machine at Figs. 4 and 5 thereof. With this arrangement one side and a portion of the bottom of the back end of the compression chamber is filled up and provides a grooved enclosure for a part of the circumference of the portion of the worm which is situated within the back portion of the compression chamber, in contact with which plate E the back end of the compressing worm works.

The plate may however be in the form illustrated at Figs. 6 and 7 of the drawings, the bottom being rounded to form a semi-circular trough $E^1$ which encloses the bottom half of the back end of the worm. In this form of filling piece, the grooves in the plate like side portion E are oblique and those in the trough like bottom preferably semi-helical.

The filling piece as shown at Figs. 8 and 9 is in the form of a tube F having a portion of the upper half of the back end omitted or removed to provide an aperture for the material to be delivered to the back end of the compressing worm-screw, one or both sides of the opening in the tube being completed by a plate $f$ of a sufficient height to project for a suitable distance into the spout or the like through which the material descends into the compression chamber. The grooves in the tubular portion are of helical configuration, those in the semi-circular back end being semi-helical and those in the side plate or plates $f$ being oblique to form continuations of the semi-helical grooves in the semi-circular back end of the tube. This form of device embodies the liner $a$ previously referred to.

The filling piece in the forms described and illustrated at Figs. 4 and 5, and 6 and 7 of the drawings fits sufficiently close up to the rear end of the grooved liner $a$ in the chamber to form a continuation thereof.

Whilst the machine as heretofore constructed produces perfectly satisfactory results when the material to be treated is in a heated state, I find that by employing a filling piece or device having a suitably grooved inside face or interior and so fitted as to partially encircle the back end of the compressing worm, or to entirely encircle it with the exception of an aperture being provided for the material to be operated on to enter the device, as before described, an additional forward movement is imparted to the material and a restraining influence is put upon it to prevent it from rotating with the compressing worm, these two factors producing an increase in the quantity of material the compressing worm carries forward, and this coupled with the fact that the grooves in the inside face or the interior of the filling piece are oblique, or oblique and semi-helical, or helical and are in the direction to cause the material to travel forward, the material is engaged and forced forward by the compressing worm in a regular quantity, it is found that meal for use as food for cattle and other animals can, in particular, be compressed when in a cold state and that grades of meal or material can be moulded which it has hitherto been considered impossible to mould.

The second part or feature of my invention resides in providing the front end of the compressing worm with a detachable piece to take the wear and thereby protect the front end of the worm.

The device is shown applied to the compressing worm at Figs. 10 to 13 inclusive and detached therefrom at Fig. 14.

The wearing piece is in the form of a suitably thick metal preferably hardened steel plate G so shaped by stamping or other suitable means as to conform to and fit the front end of the boss $g$ and a suitable portion of the front of the first coil of the thread $g^1$, or of a small removable end portion $G^1$ of the worm $G^2$, the latter being the arrangement shown in the accompanying drawings. The plate is of semi-circular or approximately semi-circular shape as will be seen more particularly on reference to Fig. 14 of the drawings, and has a hole $g^2$ through it to enable it to be passed on to the worm spindle and a key way $g^3$ to register with a key way in the removable portion $G^1$ of the worm for engaging the key in or feather on the worm spindle which prevents the two portions of the worm screw from rotating on the worm spindle.

As a further means of preventing the said wearing piece from rotating independently of the worm-screw, it is provided with a hole or holes, the drawing showing it provided with two holes $g^4$, $g^5$ to pass on to two projection on, or studs $g^6$, $g^7$ screwed into the end of the boss of the removable portion of the worm.

The said wearing strip is otherwise loose on the worm spindle, but as it rotates in contact with the inside face of the die plate of the machine it is incapable of becoming disconnected from the removable portion of the worm-screw and of rotating independently thereof when the machine is working but it can be readily removed when worn and a new one be substituted by simply disconnecting and removing the die plate.

By employing a wearing piece as described, the front end of the worm-screw is prevented from wearing away and the worm-screw, or the removable front portion thereof, will consequently last for a considerably longer time than hitherto before having to be discarded, the cost of renewing the wearing piece being so small as compared with the provision of a new worm-screw, or of a removable front portion, as to be of little or no moment.

The third part or feature of my invention resides in means for imparting a quick reciprocating motion to the screen or sieve on to which the extruded cut pieces of compressed material fall when they leave the machine.

The arrangement is shown in Fig. 1 of the drawings and consists of providing the front of the machine frame with two horizontal guide rods, one only of which is shown and is indicated by the reference letter H, and in providing each of the two sides of the screen or sieve J with two eyes which are situated a suitable distance apart on the length of the screen or sieve, those on one side of the screen or sieve only being seen and being indicated by the reference letter $j$, the eyes on the screen or sieve being passed on to the guide rods on the front of the frame of the machine whereby the screen or sieve is capable of a to and fro motion in a true course.

Fitted to the back of the screen or sieve is a short shaft like projection K the outer end of which is suitably inclined, abutting against which is the correspondingly inclined end of the main driving shaft L of the machine.

Suitably strong spiral springs M, one only of which is shown, have each one of their ends connected to the screen or sieve and the other end connected to the frame of the machine.

The screen or sieve J is forced forward during one half of the rotation of the main driving shaft as a result of the inclined end of such driving shaft turning on the correspondingly shaped end of the fixed projection K on the back of the screen or sieve, the springs M drawing such screen or sieve back during the time the shaft is making the other half of its rotation, the screen or sieve by this means having a reciprocating motion imparted to it which works the cut pieces of material down the same and causes them to fall off the end, the dust and small pieces of material passing through the bottom of the screen or sieve.

I claim:—

1. In a press, a cylindrical press chamber provided at its rear end portion with a feed passage and having a die plate at its front end, a cylindrical sleeve secured in the front end portion of the press chamber, a plate having a curved lower portion which fits in the bottom of the press chamber under the said feed passage and having a flat upper portion which is secured against one side wall of the feed passage and which projects upwardly therein above the top of the press chamber and which fits against the front and rear ends of the said passage, said sleeve and plate being provided with inclined grooves which assist the forward movement of the material, and a pressing worm mounted to revolve in the said sleeve and over the lower portion of the said plate.

2. In a press, a cylindrical press chamber provided with a die plate at one end, a pressing worm mounted to revolve in the said chamber, and a wear plate having a flat annular portion secured to the hub of the worm and bearing against the die plate and having a projection which extends outwardly from one side of its annular portion and is bent to helical form and secured against one end portion of the thread of the said worm.

In testimony whereof I affix my signature in the presence of two witnesses.

ALBERT WILLIAM SIZER.

Witnesses:
ELSIE STUBBS,
LOUIS E. KIPPAX.